United States Patent
Goldman et al.

(10) Patent No.: US 9,170,848 B1
(45) Date of Patent: Oct. 27, 2015

(54) PARALLEL PROCESSING OF DATA

(75) Inventors: Kenneth J. Goldman, Palo Alto, CA (US); Tushar Chandra, Los Altos, CA (US); Tal Shaked, Mountain View, CA (US); Jerry Zhao, San Mateo, CA (US)

(73) Assignee: Google Inc., Mountain View, CA (US)

( * ) Notice: Subject to any disclaimer, the term of this patent is extended or adjusted under 35 U.S.C. 154(b) by 292 days.

(21) Appl. No.: 13/191,703

(22) Filed: Jul. 27, 2011

Related U.S. Application Data

(60) Provisional application No. 61/368,161, filed on Jul. 27, 2010.

(51) Int. Cl.
  *G06F 9/50* (2006.01)
  *G06F 9/46* (2006.01)
  *G06F 7/00* (2006.01)
  *G06F 17/30* (2006.01)
  *G06F 9/54* (2006.01)

(52) U.S. Cl.
  CPC .............. *G06F 9/5066* (2013.01); *G06F 9/544* (2013.01); *G06F 17/30584* (2013.01)

(58) Field of Classification Search
  CPC .... G06F 9/5066; G06F 17/30584; G06F 9/54
  USPC ........................................................ 707/764
  See application file for complete search history.

(56) References Cited

U.S. PATENT DOCUMENTS

| | | |
|---|---|---|
| 7,650,331 B1 | 1/2010 | Dean et al. |
| 2005/0165768 A1* | 7/2005 | Coulson et al. ............... 707/3 |
| 2008/0086442 A1* | 4/2008 | Dasdan et al. ............... 707/1 |
| 2008/0120314 A1* | 5/2008 | Yang et al. ............... 707/101 |
| 2009/0313635 A1* | 12/2009 | Dasdan ............... 718/105 |
| 2011/0055243 A1* | 3/2011 | Kunnummal ............... 707/769 |

OTHER PUBLICATIONS

Ho, Ricky (Dec. 16, 2008). How Hadoop Map/Reduce works. Retrieved from http://architects.dzone.com/articles/how-hadoop-mapreduce-works.*
Lin, et al. (Apr. 11, 2010). Data Intensive Text Processing with MapReduce. Retrieved from lintool.github.io/MapReduceAlgorithms/MapReduce-book-final.pdf.*
Yahoo, (2009). Module 4: MapReduce. Retrieved on Nov. 19, 2013 from <http://developer.yahoo.com/hadoop/tutorial/module4.html>.*
HadoopWiki, Dec. 17, 2008. "How Map and Reduce operations are actually carried out." Retrieved on Oct. 28, 2014 from <http://wiki.apache.org/hadoop/HadoopMapReduce>.*

(Continued)

*Primary Examiner* — Brian J Gillis
*Assistant Examiner* — Juan C Turriate Gastulo
(74) *Attorney, Agent, or Firm* — Fish & Richardson P.C.

(57) ABSTRACT

Parallel processing of data may include a set of map processes and a set of reduce processes. Each map process may include at least one map thread. Map threads may access distinct input data blocks assigned to the map process, and may apply an application specific map operation to the input data blocks to produce key-value pairs. Each map process may include a multiblock combiner configured to apply a combining operation to values associated with common keys in the key-value pairs to produce combined values, and to output intermediate data including pairs of keys and combined values. Each reduce process may be configured to access the intermediate data output by the multiblock combiners. For each key, an application specific reduce operation may be applied to the combined values associated with the key to produce output data.

25 Claims, 6 Drawing Sheets

(56) References Cited

OTHER PUBLICATIONS

Pike et al., Interpreting the data: Parallel analysis with Sawzall. Scientific Programming, 13(4):277-298, 2005.

Pig. http://hadoop.apache.org/pig. as of Jul. 22, 2010, retrieved from the Internet,URL:http://web.archive.org/web/20100722094722/http://hadoop.apache.org/pig/[Mar. 29, 2012 8:30:52 AM].

Olsten et al., Pig Latin: A not-so-foreign language for data processing. In SIGMOD Conference, 2008.

Dean, Experiences with MapReduce an abstraction for large-scale computation. In PACT, 2006.

Chaiken et al., SCOPE: Easyand efficient parallel processing of massive data sets. PVLDB, 1(2), 2008.

Yu et al., DryadLINQ: A system for general-purpose distributed data-parallel computing using a high-level language. In OSDI, 2008.

Dean and Ghemawat. MapReduce: Simplified data processing on large clusters. Communication of the ACM, 51. No. 1, 2008.

Ghemawat et al. The Google file system. In SOSP, 2003.

C. Lasser and S.M. Omohundro. The essential Star-lisp manual, Technical Report 86.15, Thinking Machines, Inc., 1986.

R.S. Nikhail andArvind. Implicit Parallel Programming in pH. Academic Press, 2001.

E.Meijer et al., LINQ: reconciling objects, 2006.

Isard et al., Dryad: Distributed data-parallel programs from sequential building blocks. In EuroSys, 2007.

Larus, C. A large-grain, object-oriented, data-parallel programming language. UW Technical Report #1126, In LCPC, 1992.

Chambers, C., Raniwala, A., Perry, F., Adams, S., Henry, R.R., Bradshaw, R., and Weizenbaum, N. FlumeJava: easy, efficient data-parallel pipelines. In Proceedings of PLDI. 2010, 363-375.

Cascading. http://www.cascading.org as of Nov. 15, 2009, retrieved from the Internet, URL:http://web.archive.org/web/20091115135536/http://www.cascading.org/[Mar. 29, 2012 8:23:10 AM].

J.R. Rose and G.L. Steele Jr., C. An Extended C language. In C++ Workshop, 1987.

Hadoop. http://hadoop.apache.org. as of Jul. 27, 2010, retrieved from the Internet, URL:http://web.archive.org/web/20100727072028/http://hadoop.apache.org/[Mar. 29, 2012 8:27:38 AM].

R.H. Halstead Jr. New ideas in parallel Lip: Language design implementation, and programming tools. In Workshop on Parallel Lisp, 1989.

Chang et al., Bigtable: A distributed storage system for structured data. In OSDI, 2006.

H.-c, Yang, A. et al., Map-reduce-merge: simplified relational data processing on large clusters. In SIGMOD Conference , 2007.

Dean and Ghemawat. MapReduce. Simplified data processing on large clusters. In OSDI, 2004.

* cited by examiner

100

PARALLEL PROCESSING OF DATA

CROSS REFERENCE TO RELATED APPLICATION

The present application claims the benefit of priority from U.S. Provisional Application Ser. No. 61/368,161, filed Jul. 27, 2010, which is incorporated herein by reference in its entirety.

TECHNICAL FIELD

This disclosure relates to parallel processing of data.

BACKGROUND

Large-scale data processing may include extracting data of interest from raw data in one or more datasets and processing it into a data product. The implementation of large-scale data processing in a parallel and distributed processing environment may include the distribution of data and computations among multiple disks and processors to make use of aggregate storage space and computing power.

SUMMARY

In one aspect, a system includes one or more processing devices and one or more storage devices. The storage devices store instructions that, when executed by the one or more processing devices, implement a set of map processes and a set of reduce processes.

Each map process in the set of map processes includes at least one map thread. Map threads may be configured to access first and second distinct input data blocks assigned to the map process, apply an application specific map operation to records in the first data block to produce a first set of key-value pairs, and apply the application specific map operation to records in the second data block to produce a second set of key-value pairs. The first set of key-value pairs and the second set of key-value pairs may include at least one key common to the first and second set of key-value pairs. Each map process in the set of map processes includes a multiblock combiner configured to apply a combining operation to values associated with the common key in the first and second sets of key-value pairs to produce a combined value, and to output intermediate data including one or more pairs of keys and combined values.

Each reduce process in the set of reduce processes may be configured to access at least a subset of the intermediate data output by the multiblock combiners, the subset of intermediate data including at least a subset of the pairs of keys and combined values. For each key in the subset of keys and combined values, an application specific reduce operation may be applied to the combined values associated with the key to produce output data.

Implementations of this aspect may include one or more of the following features. For example, at least one map thread may be configured to convert the first and second key-value pairs from a native data format other than strings into a set of strings and pass the set of strings to the multiblock combiner, and the multiblock combiner may configured to receive and parse the set of strings. At least one map thread may be configured to pass the first and second set of key-value pairs directly to the multiblock combiner in a native data format other than strings. At least one map thread may include a first map thread and a second map thread. For example, the first map thread may be configured to apply the application specific map operation to records in the first data block to produce the first set of key-value pairs and the second map thread may configured to apply the application specific map operation to records in the second data block to produce the second set of key-value pairs.

The multiblock combiner may include multiple output threads executing in parallel and configured to output the intermediate data. For example, the intermediate data may include reduce shards and each output thread may be configured to handle writing output destined for a subset of the reduce shards. The multiblock combiner may be configured to apply the combining operation to the key-value pairs in the first and second set of key-value pairs as the as key-value pairs are produced by the map thread and passed to the multiblock combiner. The multiblock combiner may be configured to receive the first and second set of key-value pairs from the map thread and to apply the combining operation to the key-value pairs in the first and second set of key-value pairs after receiving the first and second set of key-value pairs.

At least two of the map processes may operate simultaneously and at least two of the reduce processes may operate simultaneously. A master process may be configured to coordinate processing among the set of map processes and the set of reduce processes, wherein the coordinating includes assigning input data blocks to individual map processes in the set of map processes.

In another aspect, a set of map processes may be executed on one or more interconnected processing devices. One or more input data blocks may be assigned to each of the map processes. For example, at least one of the map processes may be assigned a first input data block and a second input data block. In at least one map process, an application specific map operation may be applied to records in the first data block to produce a first set of key-value pairs. In the at least one map process, the application specific map operation may be applied to records in the second data block to produce a second set of key-value pairs. The first set of key-value pairs and the second set of key-value pairs may include at least one key common to the first and second set of key-value pairs, for example. In at least one map process, a combining operation may be applied to values associated with the common key in the first and second sets of key-value pairs to produce a combined value. The method further includes outputting, from the set of map processes, intermediate data including one or more pairs of keys and combined values.

A set of reduce processes are also executed on one or more interconnected processing devices. In at least one of the reduce processes, at least a subset of the intermediate data output may be accessed by the set of map processes, the subset of intermediate data including at least a subset of the pairs of keys and combined values. In at least one of the reduce process, for each key in the subset of keys and combined values, an application specific reduce operation may be applied to the combined values associated with the key to produce output data.

Implementations of this aspect may include one or more of the following features. For example, the first and second key-value pairs may be converted from a native data format other than strings into a set of strings, and applying a combining operation may include parsing the set of strings at a multiblock combiner. Applying a combining operation may include receiving the first and second set of key-value pairs at a multiblock combiner in a native data format other than strings. Applying the combining operation to the key-value pairs in the first and second set of key-value pairs may include applying the combining operation to the key-value pairs in the first and second set of key-value pairs as the as key-value pairs are received by a multiblock combiner.

Applying the application specific map operation to records in the first data block to produce the first set of key-value pairs may include applying the application specific map operation by a first map thread, and applying the application specific map operation to records in the second data block to produce the second set of key-value pairs may include applying the application specific map operation by a second map thread.

The first and second set of key-value pairs may be received at a multiblock combiner. Applying the combining operation to the key-value pairs in the first and second set of key-value pairs may include applying the combining operation to the key-value pairs in the first and second set of key-value pairs after receiving the first and second set of key-value pairs at the multiblock combiner.

A master process configured to coordinate processing among the set of map processes and the set of reduce processes may be executed. The coordinating may include assigning input data blocks to individual map processes in the set of map processes. For example, at least two of the map processes may operate simultaneously and at least two of the reduce processes may operate simultaneously.

In another aspect, a system includes one or more processing devices and one or more storage devices. The storage devices store instructions that, when executed by the one or more processing devices, cause the one or more processing devices to implement a set of map processes and a set of reduce processes.

Each map process may include at least one map thread configured to access first and second distinct input data blocks assigned to the map process, to apply an application specific map operation to records in the first data block to produce a first set of map output data, and to apply the application specific map operation to records in the second data block to produce a second set of map output data. For example, the first set of map output data may include at least a first value that is logically associated with at least a second value in the second set of map output data. Each map process may include a multiblock combiner configured to apply a combining operation to at least the first value and the second value to produce a combined value, and to output intermediate data including one or more combined values.

Each reduce process may be configured to access at least a subset of the intermediate data output by the multiblock combiners. For example, the subset of intermediate data may include at least one set of logically associated combined values and may apply an application specific reduce operation to the set of logically associated combined values to produce output data.

Implementations of this aspect may include one or more of the following features. For example, the first value and the second value may be logically associated with one another by a common key. The common key may be implicit in the first and second sets of map output data. The common key may be explicit in the first and second sets of map output data. The common key, the first value, and the second value, may be represented as key-value pairs in the first and second sets of map output.

DETAILED DESCRIPTION

This document describes systems and techniques for implementing a mapreduce process. In general, mapreduce is a process by which input data is divided into input data blocks, the input data blocks are processed by mappers that apply a map operation to the input to produce key-value pairs as map output, and the map output is sent to reducers where values associated with the same key are combined to produce a final value for each key. Each reducer may be responsible for a subset of the keys. The process for distributing data to reducers may be referred to as shuffling, and may result in each reducer receiving, from each mapper, the key-value pairs for which the reducer is responsible.

When the map operations on an input block produce map output containing duplicate keys (e.g., multiple values for some keys), the values for each key may be combined together by a combiner at the mapper before shuffling in order to send fewer bytes of information to the reducers. When multiple input blocks have keys in common, for example, the outputs of the map operation on the multiple input blocks can be combined together by a multiblock combiner at the mapper before shuffling, rather than being sent to reducers separately. For instance, the multiblock combiner may apply a reduce operator to key-value pairs output by the map operation to combine values associated with a given key across input blocks. In some implementations, the multiblock combiner may reduce the amount of data to be shuffled, thereby increasing throughput and saving resources.

In general, the techniques described in this document can be applied to large-scale data processing and, in particular, to large scale parallel data processing. Such large-scale processing may be performed in a distributed data processing system, such as a datacenter or a network of datacenters. For example, large-scale Internet services and the massively parallel computing infrastructure that support such services may employ warehouse-sized computing systems, made up of thousands or tens of thousands of computing nodes.

Figure 1:
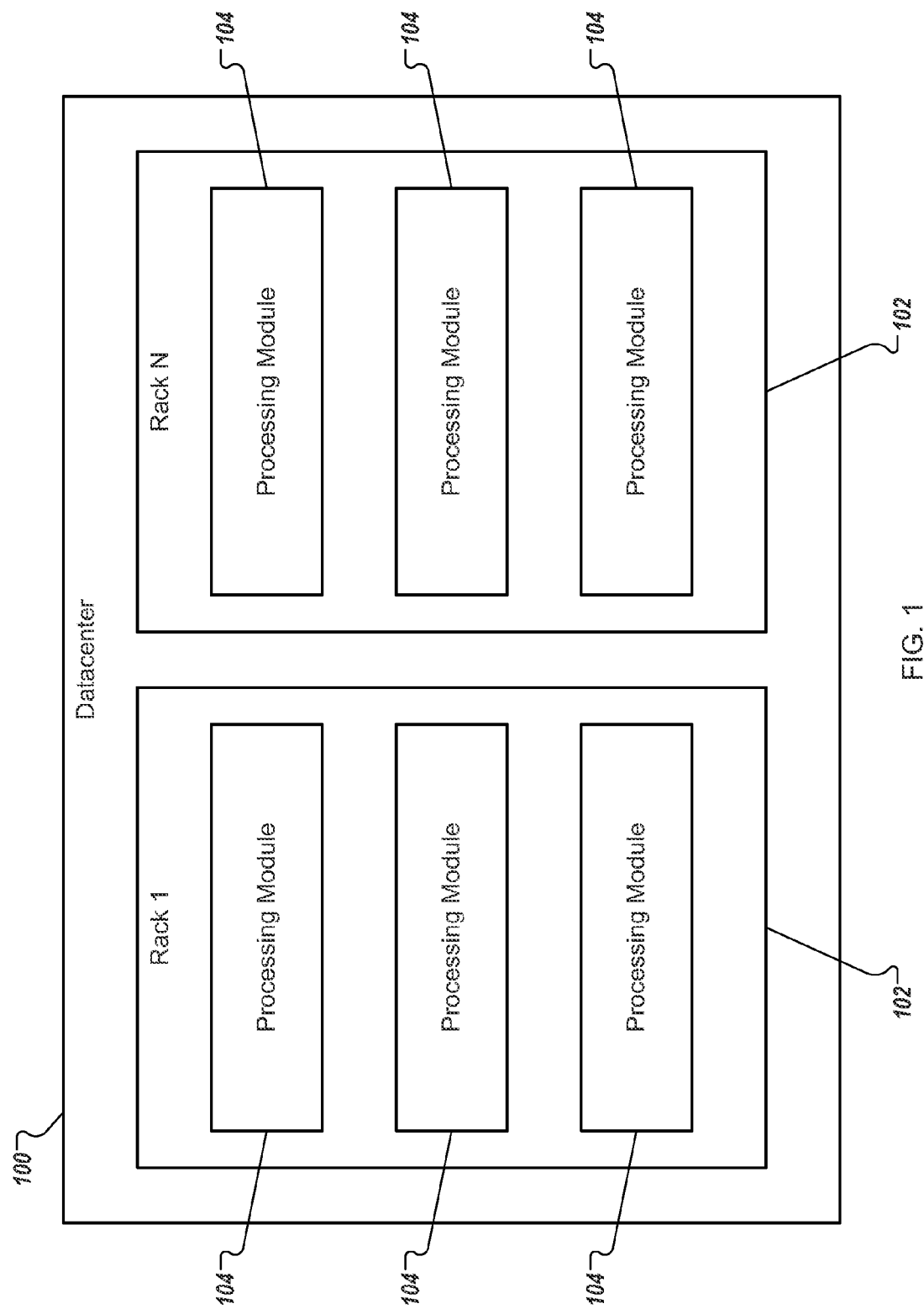
FIG. 1 is a block diagram illustrating an example of a datacenter.

FIG. 1 is a block diagram illustrating an example of a datacenter 100. The datacenter 100 is used to store data, perform computational tasks, and transmit data to other systems outside of the datacenter using, for example, a network connected to the datacenter. In particular, the datacenter 100 may perform large-scale data processing on massive amounts of data.

The datacenter 100 includes multiple racks 102. While only two racks are shown, the datacenter 100 may have many more racks. Each rack 102 can include a frame or cabinet into which components, such as processing modules 104, are mounted. In general, each processing module 104 can include a circuit board, such as a motherboard, on which a variety of computer-related components are mounted to perform data processing. The processing modules 104 within each rack 102 are interconnected to one another through, for example, a rack switch, and the racks 102 within each datacenter 100 are also interconnected through, for example, a datacenter switch.

In some implementations, the processing modules 104 may each take on a role as a master or worker. The master modules control scheduling and data distribution tasks amongst themselves and the workers. A rack can include storage (e.g., one or more network attached disks) that is shared by the one or more processing modules 104 and/or each processing module 104 may include its own storage. Additionally, or alternatively, there may be remote storage connected to the racks through a network.

The datacenter 100 may include dedicated optical links or other dedicated communication channels, as well as supporting hardware, such as modems, bridges, routers, switches, wireless antennas and towers, and the like. The datacenter 100 may include one or more wide area networks (WANs) as well as multiple local area networks (LANs).

Figure 2:
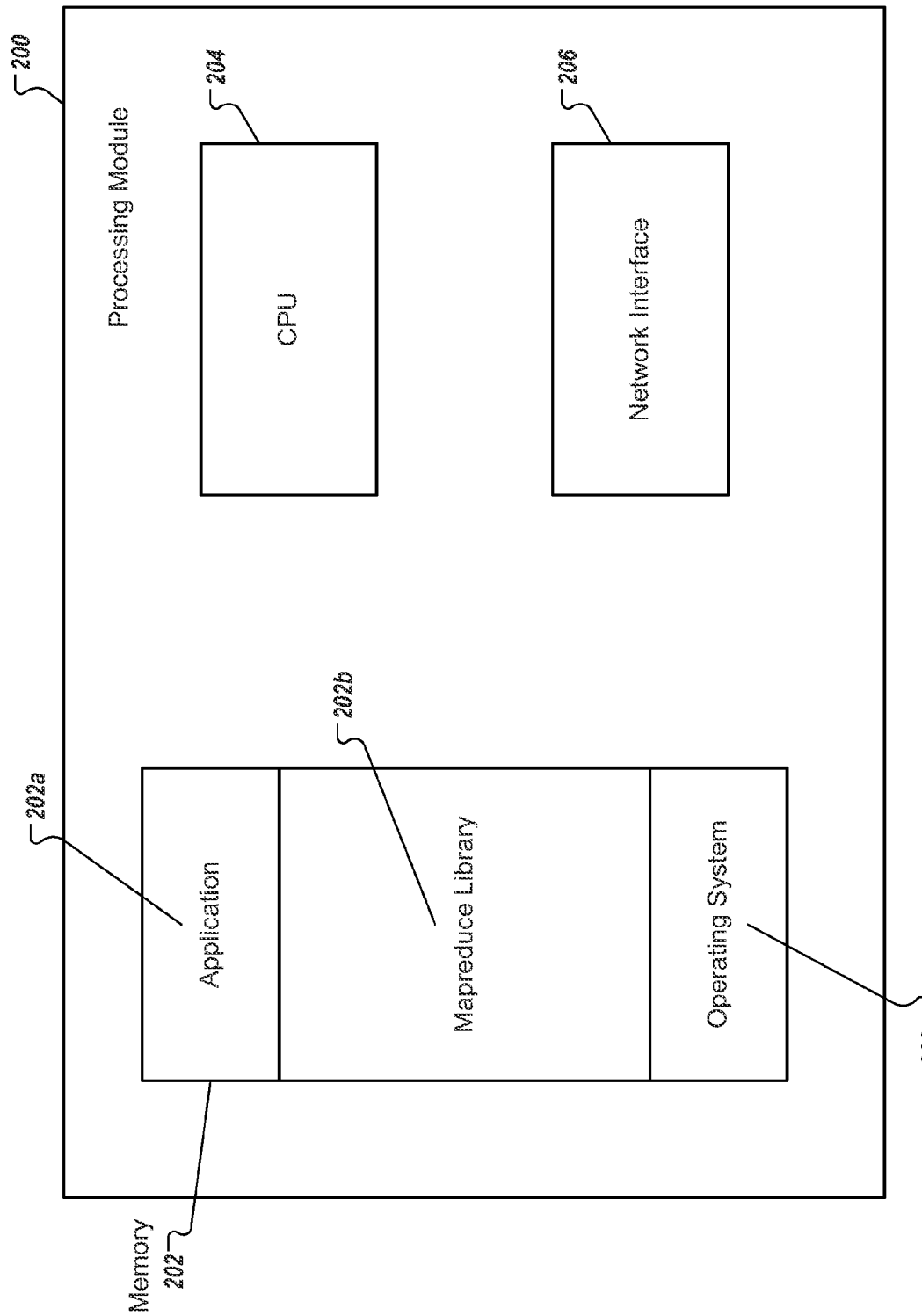
FIG. 2 is a block diagram illustrating an example of a processing module.

FIG. 2 is a block diagram of an example of a processing module 200, which may be used for one or more of the processing modules 104. The processing module 200 includes memory 202, one or more processing units (CPUs) 204, and one or more network or other communication interfaces 206. These components are interconnected by one or more communication buses. In some implementations, the processing module 200 may include an input/output (I/O) interface connecting the processing module to input and output devices such as a display and a keyboard. Memory 202 may include high speed random access memory and may also include non-volatile memory, such as one or more magnetic disk storage devices. Memory 202 may include mass storage that is remotely located from the CPU 204.

The memory 202 stores application software 202a, a mapreduce library 202b, and an operating system 202c (e.g., Linux). The operating system 202c generally includes procedures for handling various basic system services and for performing hardware dependent tasks. The application software 202a performs large-scale parallel data processing.

The mapreduce library 202b provides functions and classes that may be employed by the application software 202a to perform large-scale parallel data processing. The mapreduce library 202b can support the MapReduce programming model for processing massive amounts of data in parallel. The MapReduce model is described in, for example, MapReduce: Simplified Data Processing on Large Clusters, OSDI'04: Sixth Symposium on Operating System Design and Implementation, San Francisco, Calif., December, 2004 and U.S. Pat. No. 7,650,331, both of which are incorporated by reference.

In general, the MapReduce model provides an abstraction to support application developers in thinking about their computations. The application developers can formulate their computations according to the abstraction, which can simplify the building of programs to perform large-scale parallel-data processing. The application developers can employ the MapReduce model with or without using the mapreduce library 202b. The mapreduce library 202b, however, can manage many of the difficult low-level tasks. Such low-level tasks may include, for example, selecting appropriate parallel worker machines, distributing to them the program to run, managing the temporary storage and flow of intermediate data between the three phases, synchronizing the overall sequencing of the phases, and coping with transient or permanent failures of machines, networks, and software.

The MapReduce model generally involves breaking computations down into a mapreduce operation, which includes a map operation and a reduce operation. The map operation performs an operation on each of the logical records in the input to compute a set of intermediate key-value pairs. The reduce operation performs an operation on the values that share the same key to combine the values in some manner. Implicit in this model is a shuffle operation, which involves grouping all of the values with the same key.

The mapreduce library 202b may implement a map phase, a shuffle phase, and a reduce phase to support computations formulated according to the MapReduce model. In some implementations, to use the mapreduce library 202b, a user program or another library calls the mapreduce library 202b, specifying information identifying the input file(s), information identifying or specifying the output files to receive output data, and two application-specific data processing operators, the map operator and the reduce operator. Generally, the map operator specifies a map function that processes the input data to produce intermediate data and the reduce operator specifies a reduce function that merges or otherwise combines the intermediate data values. The mapreduce library 202b then employs this information to implement that map phase, the shuffle phase, and the reduce phase.

The map phase starts by reading a collection of values or key-value pairs from an input source, such as a text file, binary record-oriented file, or database. Large data sets may be represented by multiple, even thousands, of files, and multiple files can be read as a single logical input source. The map phase then invokes the user-defined function, the map function or mapper, on each element, independently and in parallel. For each input element, the user-defined function emits zero or more key-value pairs, which are the outputs of the map phase.

The shuffle phase takes the key-value pairs emitted by the mappers and groups together all the key-value pairs with the same key. The shuffle phase then outputs each distinct key and a stream of all the values with that key to the next phase, the reduce phase.

The reduce phase takes the key-grouped data emitted by the shuffle phase and invokes the user-defined function, the reduce function or reducer, on each distinct key-and-values group, independently and in parallel. Each reducer invocation is passed a key and an iterator over all the values associated with that key, and emits zero or more replacement values to associate with the input key. The reducer typically performs some kind of aggregation over all the values with a given key. For some operations, the reducer is just the identity function. The key-value pairs emitted from all the reducer calls are then written to an output sink, e.g., a file or database.

To implement these phases, the mapreduce library 202b may divide the input into M input data blocks (for example, into 64 megabyte (MB) sized files), otherwise referred to as shards, and start up multiple copies of the program that uses the library 202b on a cluster of machines, such as multiple ones of the processing modules 104. One of the copies may be a master copy and the rest may be worker copies that are assigned work by the master. The master selects idle workers and assigns each one a map task or a reduce task. The workers assigned to a map task use the mapper to perform the mapping operation on the inputs to produce the intermediate results, which are divided, for example, into R sets. When the intermediate results are divided into R sets, there are R reduce tasks to assign. The workers assigned to a reduce task use the reducer to perform the reduce operation on the intermediate values to produce the output. Once all map tasks and all reduce tasks are completed, the master returns to the user program or library employing the mapreduce library 202b. As a result, the mapreduce operation is implemented as a set of parallel operations across a cluster of processing devices.

For reducers that first combine all the values with a given key using an associative, commutative operation, a separate user-defined combiner function can be specified to perform partial combining of values associated with a given key during the map phase. Each map worker can keep a cache of key-value pairs, and use the combiner function to combine locally as much as possible before sending the combined key-value pairs on to the shuffle phase. The reducer may complete the combining step by combining values from different map workers. As described in more detail below, the combiner may be implemented as a multiblock combiner that combines values over multiple input blocks, or shards.

By default, the shuffle phase may result in each key-and-values group being sent to an arbitrarily but deterministically chosen reduce worker, with this choice determining which output file will hold that key's results. Alternatively, a user defined sharder function can be specified that selects which reduce shard or "bucket" should receive the group for a given key (with reduce shards eventually being assigned to particular workers). The user-defined sharder can be used to aid in load balancing. The user-defined sharder can also be used to sort the output keys into reduce shards or buckets, with all the keys of the $i_{th}$ reduce shard being ordered before all the keys of the $i_{th}$+1st reduce shard. Coupled with the fact that each reduce worker processes keys in sorted order, this kind of sharder can be used to produce sorted output.

In general, the application software 202a may employ the mapreduce library 202b. For example, an application developer may develop application software that employs the mapreduce library 202b to perform computations formulated as a mapreduce operation.

Figure 3:
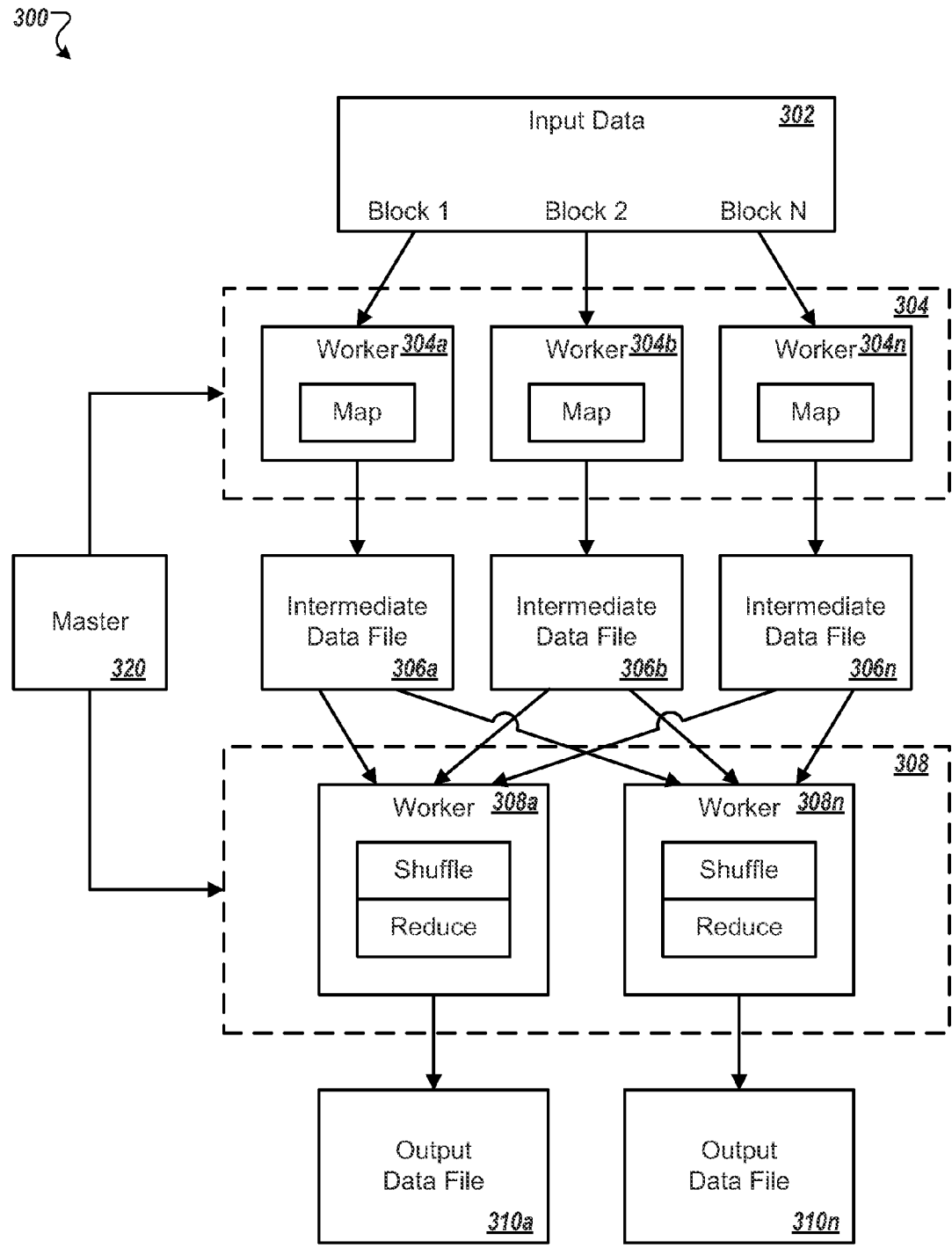
FIG. 3 is a block diagram illustrating a data processing system.

FIG. 3 is a block diagram illustrating a data processing system 300, which may be supported by the datacenter 100 and the processing module 200. The processing system 300 is implemented, for example, by the mapreduce library 202b (shown in FIG. 2) to perform processing according to the MapReduce model. In general, processing system 300 may be used to process input data 302 which may be divided into input data blocks. Coordinated by a master process 320, for example, multiple workers 304 may apply mapping operations to the data blocks to produce intermediate data files 306. Also coordinated by the master process 320, for example, multiple workers 308 may apply shuffle and reduce operations to the intermediate data files 306 to produce output data files 310.

In some implementations, one or more master processes 320 can assign one or more tasks to one or more workers 304 and 308. For example, the master process 320 may be a task that is responsible for assigning other tasks (e.g., mapping and reducing tasks) to the workers 304, 308, in a master/slave type relationship. The workers 304, 308 include one or more process threads which can be invoked based on the particular task assigned to it by the master process 320. For example, each worker process 304 invokes a map thread to handle an assigned map task. In some implementations, the workers 304, 308 include one or more additional threads. For example, a worker may be assigned multiple map tasks in parallel and a distinct thread may be assigned to process each map task. In another example, a distinct thread may be used to receive remote procedure calls (e.g., from the master process) and to coordinate work done by the other threads. In another example, a distinct thread may be used to handle remote read requests received from other processors (i.e., peers) in the system.

In some implementations, the number of workers may be equal to the number of machines available in the system 300 (i.e., one worker process per machine). In some implementations, two or more workers 304, 308 are used in each of the machines in the system 300. If a worker process fails, for example, its task may be reassigned to another worker process by the master process 320. In some implementations, the master process 320 may undertake remedial measures to repair, restart, or replace a failed worker process.

In some implementations, shuffle/reduce tasks may be immediately assigned to processes, but the shuffle/reduce tasks do not begin work (e.g., on data sorting) until the master process 320 informs them that there are intermediate files ready for processing. In some implementations, a single worker process 304, 308 can be assigned both a map task and a shuffle/reduce task simultaneously (with each being executed by a distinct process thread), and therefore assigning shuffle/reduce tasks to processes at the beginning of the job does not reduce the throughput of the system 300.

The division of input data 302 into data blocks 1, . . . , N, may be handled automatically by application independent code. Alternately, the user may set an optional flag, or specify a parameter, so as to control the size of the data blocks into which the input files are divided. Furthermore, the input data may come from sources other than files, such as a database or in-memory data structures.

The input data blocks 1, . . . , N are read by workers 304a-304n, as shown in FIG. 3. The records in the input data blocks may include or be treated as key-value pairs. The input data 302 can include a variety of data types typically used in data processing systems, including without limitation text, record I/O, sorted data structures (such as B-trees), tables and the like. Each of the workers 304 to which a map task has been assigned can apply an application-specific map( ) operator to records in the respective input data block so as generate intermediate data values including key-value pairs. In some implementations, a multiblock combiner (shown in FIG. 4) implemented by workers 304 may further process the intermediate data values. For example, the multiblock combiner can combine the values associated with a given key across the input data blocks processed by the workers 304, and can generate intermediate data files 306. Each intermediate data file 306, for example, can include data associated with a particular key and can include combined values associated with the key.

In some implementations, the intermediate data files 306 may be retained until the shuffle/reduce phase completes. For example, the intermediate data files 306 may be stored locally at the machine (e.g., in one or more local file systems or databases) in which the worker process 304 is executed, or within a distributed file system. In some implementations, if there are enough workers 304 that the intermediate values can be held in memory across the workers, then the system 300 need not write any data to files on local disks. This may reduce execution time for mapreduce operations in which the number of workers is sufficient to handle all the map tasks at once, and the amount of intermediate data is sufficiently small to be kept in memory.

When a worker process 304 completes its assigned task, it can inform the master process 320 of the task status (e.g., complete or error). In some implementations, the worker process's status report may be treated by the master process 320 as a request for another task.

Workers 308, which have been assigned shuffle and reduce tasks, read data from the intermediate data files 306. In some implementations, the master process 320 informs the workers 308 where to find intermediate data files 306 and schedules read requests for retrieving intermediate data values from the intermediate data files 306. For example, the shuffle tasks may read the key-value pairs that have been assigned to a particular reducer from the various intermediate files.

In some implementations, each worker process 308 can sort the intermediate data values in the subset of the intermediate data files 306 read by that worker process in accordance with the key of the key-value pairs in the intermediate data. For example, the sorting of the key-value pairs may be an application independent function of the shuffle threads in the workers 308. Each worker process 308, for example, can merge or otherwise combine the sorted intermediate data values having the same key, and can write the key and combined values to one or more output data files 310. The merging or other combining operation performed on the sorted intermediate data may be performed by an application-specific reduce( ) operator. In some implementations, the output data files 310 are stored in a file system, which may be accessible to other systems via a distributed network. When a worker process 308 completes its assigned reduce task, for example, it can inform the master process 320 of the task status (e.g., complete or error). If the reduce task was completed successfully, for example, the worker process's status report may be treated by the master process 320 as a request for another task. If the reduce task failed, for example, the master process 320 may reassign the reduce task to another worker process 308.

In some implementations, the master process 320 may be configured to detect task and processor failures. When a task failure is detected, for example, the master process 320 may reassign the task to another process. In some implementations, the master process 320 can redistribute the work of a failed task over a larger number of tasks so as to complete that task more quickly than by simply re-executing the task on another process.

When a processor failure is detected by the master process 320, for example, it may be necessary to re-execute the tasks that the failed processor completed as well as tasks that were in process when the processor failed. For example, the intermediate results produced by map tasks may be stored locally, and the failure of the processor may make those results unavailable. The master process 320 can determine which tasks ran on the processor (e.g., by using status tables), and can determine which of those tasks need to be re-executed (e.g., because the results of the tasks are unavailable and are still needed). In some implementations, the master process 320 may update its status tables to indicate that these identified tasks are waiting for assignment to worker tasks. Thereafter, re-execution of the identified tasks may be handled automatically using the processes and mechanisms described elsewhere in this document.

Figure 4:
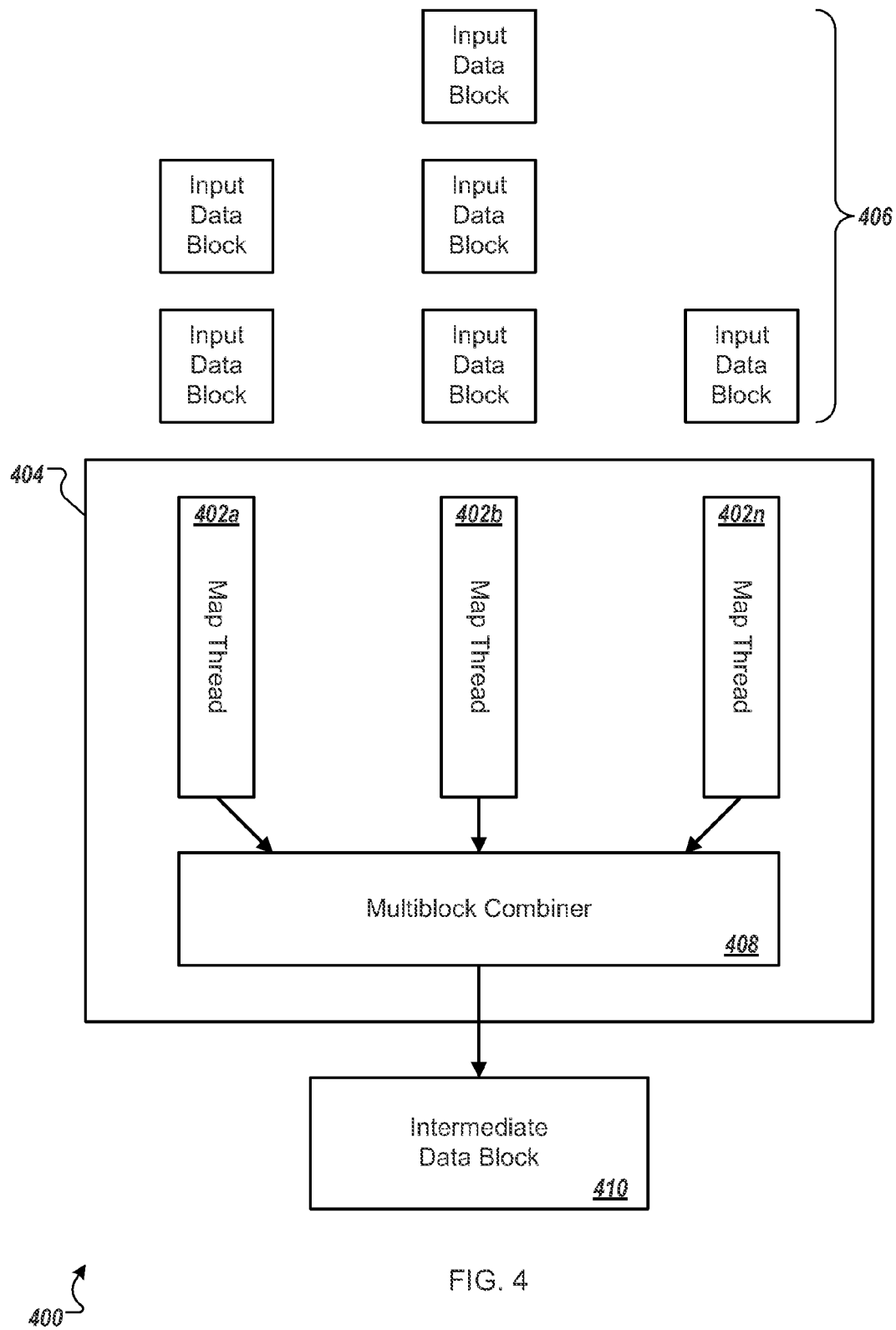
FIG. 4 is a block diagram illustrating an example of a system for combining output from one or more map threads in a map worker.

FIG. 4 is a block diagram illustrating an example of a system 400 for combining output from one or more map threads 402a-402n across one or more input data blocks 406 in a map worker 404. By combining, at the map worker 404, the values in the outputs resulting from more than one input data block, the volume of data processed in shuffling and reducing stages may be decreased, thereby increasing throughput and optimizing the use of resources. For example, when multiple input data blocks 406 include common keys, their output can be combined together by a multiblock combiner 408 before shuffling, rather than being sent to reducers separately. Moreover, instead of splitting buffer space for map output among map threads 402, for example, the multiblock combiner 408 may operate in a shared memory structure to provide for combining data across input data blocks 406 and map threads 402. Thus, relatively more keys may be held in memory, providing relatively greater opportunity to combine output. For example, if a mapreduction includes a billion keys and uses multithreaded mappers for improved I/O throughput, in some cases there may be insufficient RAM for each thread to accumulate or combine values for each key in multiple input blocks. However, in some implementations, the multiblock combiner 408 may have enough memory to store the output from the processing of multiple input blocks. The multiblock combiner 408 can then accumulate or combine the values associated with any given key resulting from the multiple input blocks, and can produce a single combined output, rather than separate outputs for each of the input data blocks 402.

In some implementations, the map worker 404 is implemented by a worker process 304 (shown in FIG. 3). For example, the map worker 404 may access one or more input data blocks 406, such as data blocks partitioned from the input data 302 (also shown in FIG. 3), and may perform one or more data mapping processes for each of the blocks. As shown in FIG. 4, the map worker 404 can be multithreaded, with each map thread 402a-402n performing data mapping processes for one or more input data blocks 406, although single-threaded implementations may also be possible. In multithreaded implementations, for example, a thread-safe version of the multiblock combiner 408 may be used to enable concurrent mapping calls from the map threads 402; a non-thread-safe version of the multiblock combiner 408 may use locking to handle single mapping calls.

In general, the multiblock combiner 408 can receive output from map threads 402a-402n, and may produce accumulated output as intermediate data block(s) 410. For example, the multiblock combiner 408 can combine values associated with a given key to produce a combined value. In addition to combining values associated with the given key included in one of the input data blocks 408, for example, the multiblock combiner 408 can combine values associated with the given key across multiple data blocks 408. In some cases, for example, there is significant repetition in the intermediate keys produced by each map thread 402 (and/or significant repetition across multiple input blocks, whether processed by a single map thread or multiple map threads), and the application-specific reduce function is both commutative and associative. An example of a situation in which the reduce function is both commutative and associative is a mapreduce operation for counting the number of occurrences of each distinct word in a large collection of documents. In this example, the application-specific map function (sometimes called the map( ) operator elsewhere in this document) outputs a key-value pair for every word w in every document in the collection, where the key-value pair is <w, 1>. The application-specific reduce function for this example is:

input data is "values";
    int result=0; //initialize result to zero
    for each v in values:
    result+=ParseInt(v);
    output: <key, result>

Each map task in this example may produce hundreds or thousands of records of the form <word, 1>. The reduce function can add up the count values, for example. To help conserve network bandwidth for mapreduce operations that satisfy these properties, for example, the multiblock combiner 408 can be invoked with each unique intermediate key and a partial set of intermediate values for the key. In some implementations, the multiblock combiner 408 partially summarizes the intermediate key-value pairs for each key across the input data blocks 406. The partial combining performed by the multiblock combiner 408 may speed up certain classes of mapreduce operations, in part by significantly reducing the amount of information to be conveyed from the processors that handle map tasks to processors handling reduce tasks, and in part by reducing the complexity and computation time required by the data sorting and reduce function performed by the reduce tasks.

In some implementations, the multiblock combiner 408 may produce output on the fly as it receives input from map threads 402a-402n. For example, the combiner 408 can include memory management functionality for generating output as memory is consumed. In some implementations, the multiblock combiner 408 may produce output after processing one or more of the input data blocks 406, or upon receiving a Flush( ) command for committing data in memory to storage. By accumulating values for duplicate keys across multiple input data blocks 406, for example, the multiblock combiner 408 can generate intermediate data block(s) 410 which may be relatively compact in comparison to blocks generated by a combiner that only combines values for a single output block. In general, the intermediate data block 410 includes key-value pairs output by the multiblock combiner 408 after processing multiple input data blocks 406 together. When the intermediate data block 410 is processed (e.g., by worker process 308, shown in FIG. 3), consuming the block 410 may in some implementations be similar to consuming output that would have been generated for individual members of the block 410 (i.e., each of the input data blocks 406).

The system 400 can be used in various ways, for example, based on aspects of the input data and mapping functions used by the system, as well on aspects of employed processing and storage devices. In some cases, such as when the multiblock combiner 408 can hold key-value pairs in memory until the input data blocks 406 are processed, the multiblock combiner 408 may generate pairs of keys and combined values after all blocks in the set of input data blocks 406 are processed. For example, upon receiving key-value pairs from map thread 402a for one of the input data blocks 406, the multiblock combiner 408 may maintain the pairs in memory or storage until receiving key-value pairs for the remaining input data blocks 406. In some implementations, the keys and combined values can be maintained in a hash table or vector. After receiving key-value pairs for all of the input data blocks 406, for example, the multiblock combiner 408 may apply combining/reducing operations on the key-value pairs to produce a set of keys, each with associated combined values. For example, for a summing operation, the multiblock combiner 408 can accumulate and finally produce a count associated with each key. Generally, maximum combining may be achieved if the multiblock combiner 408 can hold all keys and combined values in memory until all input data blocks 406 are processed. However, the combiner 408 may produce output at other times, for example, to flush periodically due to memory limitations. In some implementations, upon receiving a Flush( ) call, the multiblock combiner 408 may iterate over the keys in a memory data structure, and may produce a combined key-value pair for each key. In some implementations, rare keys may be flushed when the memory data structure becomes large, and more common keys may be kept in memory until a final Flush( ) command.

In some cases, rather than holding the key-value pairs produced by the map threads 402a-402n individually in memory prior to combining, the multiblock combiner 408 may instead update key values as the multiblock combiner 408 receives key-value pairs. For example, for a summing operation, the multiblock combiner 408 can increment a count value associated with a key as it receives new key-value pairs for that key. Assuming that all keys can be held in memory, the multiblock combiner 408 may hold all of the keys and combined values in memory until all of the input data blocks 406 have been processed, at which time the multiblock combiner 408 may output the pairs of keys and combined values as intermediate data. In other situations, the multiblock combiner 408 may output pairs of keys and combined values before the all of the input data blocks 406 are processed; for example, this may occur when there is insufficient memory to hold all of the key and combined values.

In some cases, the multiblock combiner 408 may be configured to accept direct calls from map threads 402. For example, by receiving direct calls, the multiblock combiner 408 may avoid the overhead of converting data output values from map threads 402 into strings if such values are of some other native data format. As another example, the map threads 402 may be configured to convert key-value pairs from a native data format other than strings into a set of strings and pass the set of strings to the multiblock combiner 408, which may then receive and parse the set of strings. In some implementations, one or more map threads 402 may be configured to provide native data to the multiblock combiner 408 when processing multiple input data blocks 406, and to provide string data when processing a singleton (e.g., one of the input data blocks 406). In some implementations, the multiblock combiner 408 may be configured to perform additional calculations upon receiving data output values from map threads 402. For example, in addition to key-value pairs, secondary keys and/or other data may be passed into the multiblock combiner 408 by one or more map threads 402 and additional calculations may be performed using such data. In some implementations, output from the multiblock combiner 408 may be produced by multiple threads. For example, each thread may be responsible for writing output for a subset of the keys in order to parallelize output processing and decrease latency.

Various techniques may be used to recover from process failures. In general, data blocks assigned to a failed process may be reassigned to other processes. For example, if the map worker 404 (or one or more map threads 402 coordinated by the worker 404) fails while processing one or more input data blocks 406, the data block(s) may be assigned to another map worker or another map worker thread. However, in some situations, before failing, the map worker 404 may have sent the intermediate data block 410 (or a portion of the block) to one or more shuffle processes. For example, data associated with the intermediate data block 410 may have been sent to a shuffler as a result of a Flush( ) command. To prevent double counting, in some implementations, the system 400 may ensure that the data destined for a given reducer from one or more intermediate data blocks 410 are processed by that reducer in its entirety or not at all, that map output data based on a single input data block 406 is consumed only if the output has not also been consumed as part of an intermediate data block 406, and that two intermediate data blocks 406 do not overlap in their corresponding input data blocks 406.

In some implementations, a technique for recovering from a process failure may include discarding or ignoring the intermediate data block 410 and redistributing the input data blocks 406 to ensure that the blocks 406 are not part of another intermediate data block. For example, the master process 320 (shown in FIG. 3) can specify that each of the input data blocks 406 are to be processed individually (i.e., as singletons), which may prevent waiting for all of the data blocks 406 to be processed together as another (combined) intermediate data block 410. Moreover, the possibility of duplication may be prevented.

In some implementations, a technique for recovering from a process failure may include distributing one or more input data blocks 406 to another map worker 404 (or another map thread 402). For example, the master process 320 can assign one or more input data blocks 406 to another map worker 404, and the worker 404 can incorporate output data associated with the data blocks 406 into its current intermediate data block 410. If the map worker 404 does not receive additional input data blocks 406 from the master process 320 for a certain period of time (e.g., 15 seconds) after processing its last assigned input data block 406, for example, it can inform the master process 320 that it has completed processing. In some implementations, the master process 320 may track which input data blocks 406 are part of the intermediate data block 410. For example, the master process 320 may redistribute one or more input data blocks 406 from a failed map worker to another worker, and may inform subsequent process workers (e.g., shufflers or reducers) that an intermediate data block associated with the failed map worker is not to be used. In some implementations, if one or more input data blocks 406 are redistributed to a map worker, the map worker may commit its intermediate data block and start a new one. For example, map threads associated with the map worker may complete processing their current input data blocks before processing redistributed data blocks. In some implementations, before sending the intermediate data block 410 to a subsequent process worker (e.g., shufflers or reducers), the map worker 404 or the multiblock combiner 408 may request permission from the master process 320 to release the data block 410. If the map worker 404 should fail before acquiring permission, for example, one or more input data blocks 406 processed by (and/or blocks to be processed by) the worker 404 may be assigned to another worker.

Figure 5:
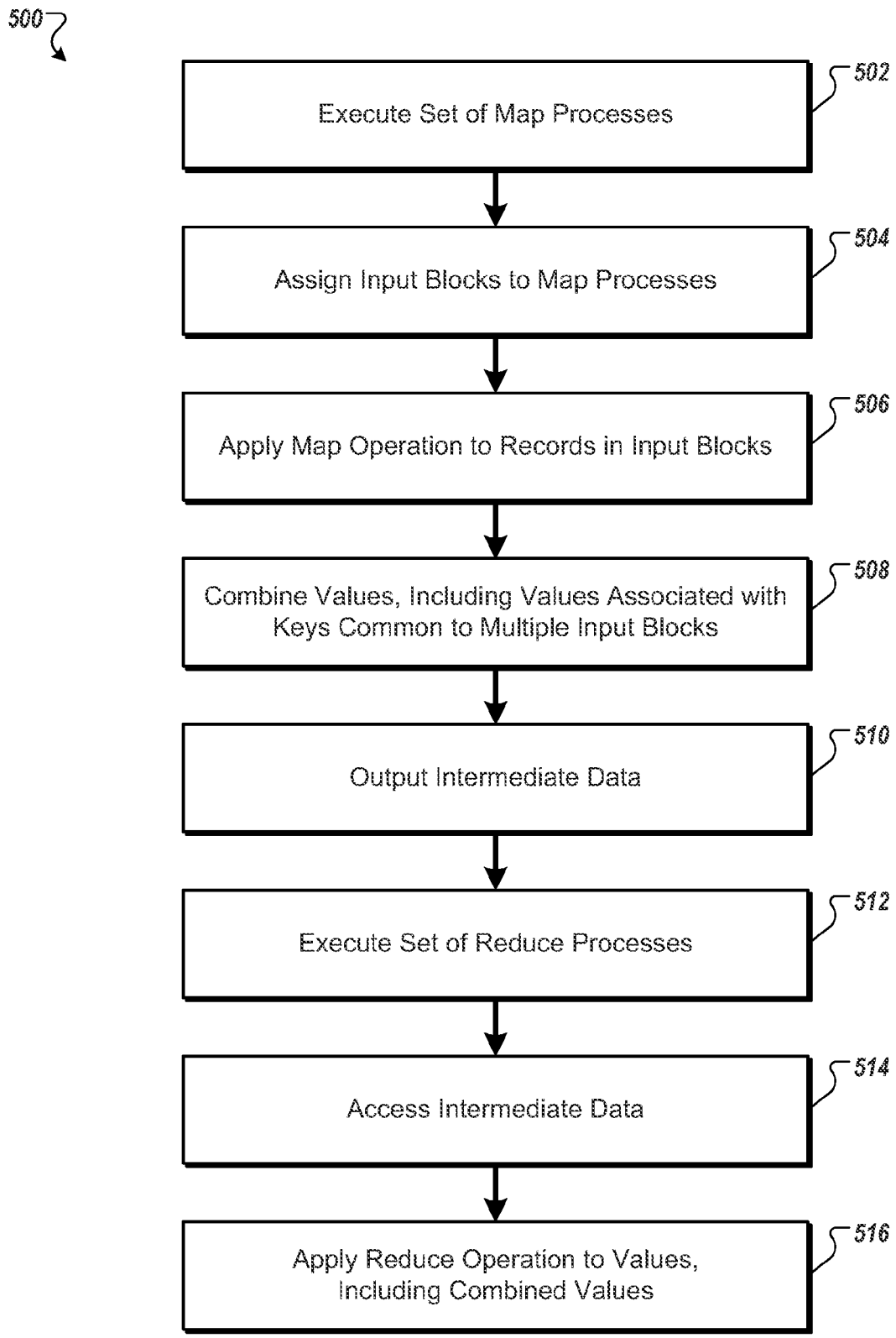
FIG. 5 is a flow chart illustrating an example of a process for processing data.

FIG. 5 is a flow chart illustrating an example of a process 500 for processing data. The following describes components of the data processing system 300 (shown in FIG. 3) and components of the system 400 (shown in FIG. 4) as performing process 500, but other components of systems 300, 400, or another system, may perform process 500.

Referring to FIG. 5, one or more workers 304 are executed as a set of map processes (502). For example, the map processes can be executed on one or more interconnected processing devices, such as the processing modules 104 (shown in FIG. 1). One or more blocks of input data 302 may be assigned to the map processes (504). For example, the master process 320 can be configured to coordinate processing among the set of map processes, and can assign input data blocks to individual map processes in the set of map processes. In some implementations, map processes can be configured to receive multiple input blocks. For example, the map processes can access one or more input data blocks associated with the map processes using map threads. Such multi-threaded operation may enable two or more map processes to operate simultaneously, for example.

Application-specific map operations are applied to records in the input data blocks (506). For example, application-specific map operations may be configured to filter, aggregate, or transform data associated with the records, to name a few possibilities. In some implementations, the map operation(s) can be applied in at least one map process to each of the data blocks associated with the map process to produce a corresponding set of key-value pairs for each of the data blocks. For example, two or more sets of key-value pairs may include at least one key in common to both sets of pairs. In some implementations, at least one map thread included in the map process(es) may be configured to convert the key-value pairs from a native data format other than strings into a set of strings, and to pass the set of strings to the multiblock combiner 408 (shown in FIG. 4). The multiblock combiner 408 may be configured to receive and parse the strings, for example. In some implementations, at least one map thread included in the map process(es) may be configured to pass the key-value pairs directly to the multiblock combiner 408 in a native data format other than strings. In some implementations, a map thread included in a map process may include multiple sub-threads to apply application specific map operations to distinct data blocks for producing key-value pairs.

The multiblock combiner 408 can apply a combining operation to values associated with a common key in each of the key-value pairs to produce a combined value (508). In some implementations, the multiblock combiner 408 may be configured to apply the combining operation to key-value pairs as the pairs are produced by one or more map threads and passed to the multiblock combiner 408. For example, upon receiving key-value pairs from map thread 402a for one the input data blocks 406, the multiblock combiner 408 may apply the combining operation, and upon receiving key-value pairs from map thread 402b for another one of the input data blocks 406, the multiblock combiner 408 may again apply the combining operation. In some implementations, the multiblock combiner 408 may be configured to receive multiple key-value pairs from one or more map threads and may apply the combining operation after the multiple key-value pairs are received. For example, upon receiving key-value pairs from map thread 402a for one of the input data blocks 406, the multiblock combiner 408 may maintain the pairs in memory or storage until receiving key-value pairs from map thread 402b for another one of the input data blocks 406. After receiving the multiple key-value pairs, for example, the multiblock combiner 408 may apply the combining operation. As another example, the multiblock combiner 408 may apply the combining operation after receiving key-value pairs from map threads 402 for all of the input data blocks 406.

From the set of map processes, intermediate data can be output (510). For example, the multiblock combiner 408 can produce the intermediate data block 410 including keys and combined values as part of the intermediate data produced by the map processes 304. To process the intermediate data, a set of reduce processes is executed (512). For example, the reduce processes can be executed on one or more interconnected processing devices, such as the processing modules 104 (shown in FIG. 1). In some implementations, multiple reduce processes may operate simultaneously with each other and with multiple map processes. For example, the workers 308 (shown in FIG. 3) may be configured to operate in a multithreaded environment, and the master process 320 can be configured to coordinate processing among the set of reduce processes. The reduce processes can access the intermediate data (514). In some implementations, in at least one of the reduce processes included in the workers 308, at least a subset of the intermediate data output by the set of map processes (e.g., data included in the intermediate data files 306) can be accessed. The subset of intermediate data can include at least a subset of the pairs of keys and combined values, for example. The reduce processes can apply reduce operations to values, including combined values (516). In some implementations, in at least one reduce process, for each key in the subset of keys and combined values, an application specific reduce operation can be applied to the combined values associated with the keys to produce output data. For example, each of the output data files 310 may be associated with a particular key and may include combined values associated with the key.

Figure 6:
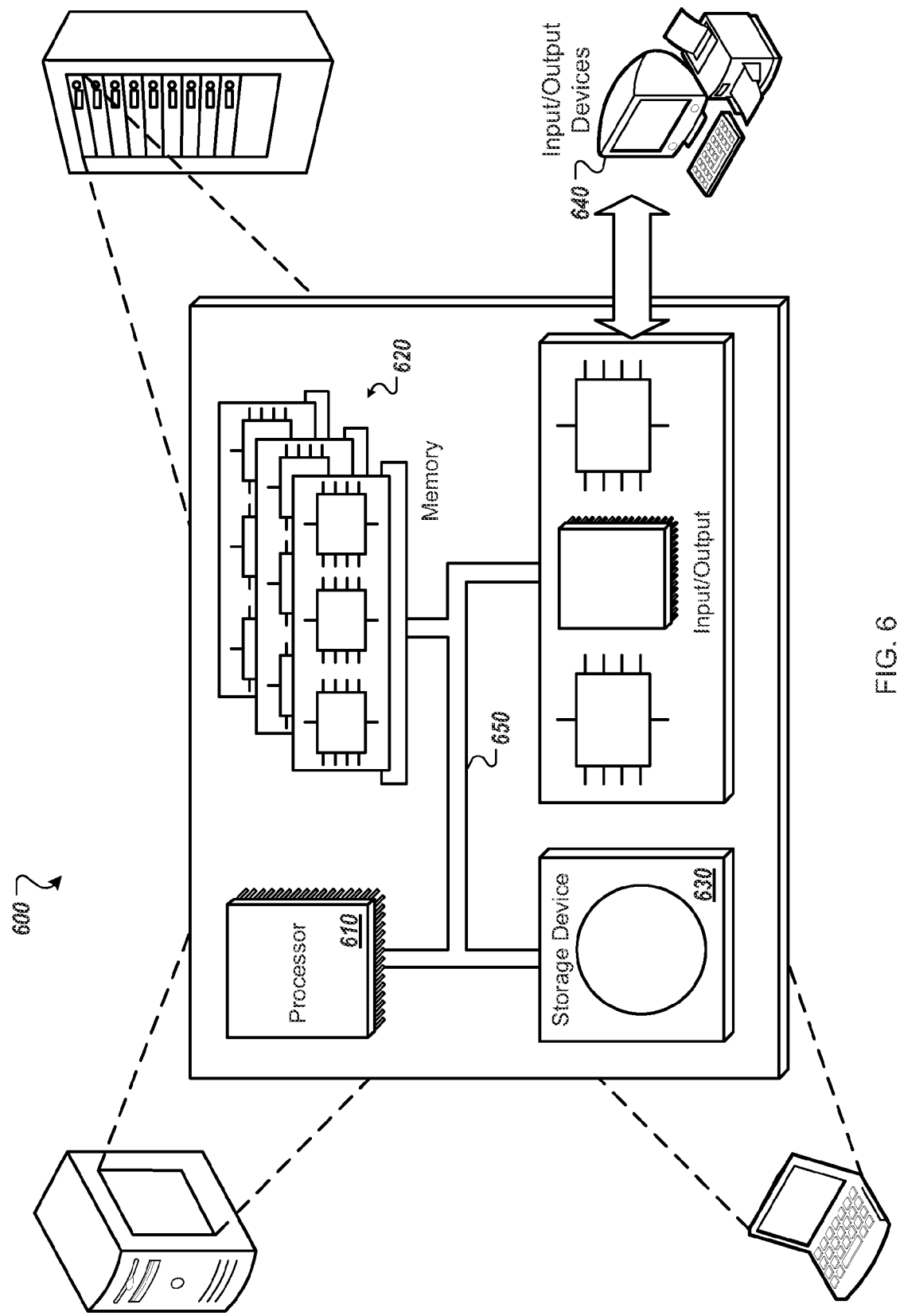
FIG. 6 is a schematic diagram illustrating an example of a computer system that can be used to implement the techniques described here.

FIG. 6 is a schematic diagram of an example of a generic computer system 600. The system 600 can be used for the operations described in association with the method 500 according to one implementation. For example, the system 600 may be included in either or all of the datacenter 100 and the processing module 200.

The system 600 includes a processor 610, a memory 620, a storage device 630, and an input/output device 640. Each of the components 610, 620, 630, and 640 are interconnected using a system bus 650. While not shown, a network interface may be included for communications across a network. The processor 610 is capable of processing instructions for execution within the system 600. In one implementation, the processor 610 is a single-threaded processor. In another implementation, the processor 610 is a multithreaded processor. The processor 610 is capable of processing instructions stored in the memory 620 or on the storage device 630 to display graphical information for a user interface on the input/output device 640.

The memory 620 stores information within the system 600. In one implementation, the memory 620 is a computer-readable medium. In one implementation, the memory 620 is a volatile memory unit. In another implementation, the memory 620 is a non-volatile memory unit.

The storage device 630 is capable of providing mass storage for the system 600. In one implementation, the storage device 630 is a computer-readable medium. In various different implementations, the storage device 630 may be a floppy disk device, a hard disk device, an optical disk device, or a tape device.

The input/output device 640 provides input/output operations for the system 600. In one implementation, the input/output device 640 includes a keyboard and/or pointing device. In another implementation, the input/output device 640 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other.

Although a few implementations have been described in detail above, other modifications are possible. For example, the datacenter 100 and the processing module 200 may be implemented within the same computer system. In addition, while the map workers have been described as producing sets of map output that include explicit keys in key-value pairs, other implementations may produce map outputs with logically associated values in other ways. For instance, rather than the map output being represented as explicit key-value pairs, the output may include a set of single values, where each value implicitly defines a key that logically associates values with one another or is otherwise structured such that a destination reduce shard or grouping can be determined (for example, a sharder function can determine the reduce shard from the output without an explicitly represented key). Similarly, the multiblock combiner may be designed to combine values based on such implicit keys or other information. For example, the multiblock combiner may be designed to examine the values, possibly with the help of an application-specific method, and determine which ones can be combined and how to combine them.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

A number of implementations have been described. Nevertheless, it will be understood that various modifications may be made. Accordingly, other implementations are within the scope of the following claims.

What is claimed is:

1. A system for parallel processing of data, the system comprising:
   one or more processing devices;
   one or more storage devices storing instructions that, when executed by the one or more processing devices, cause the one or more processing devices to implement:
   a set of map processes, each map process including:
      a first map thread configured to access a first distinct input data blocks assigned to the map process and a second map thread configured to access a second distinct input data blocks assigned to the map process, the first map thread configured to apply an application specific map operation to records in the first data block to produce a first set of key-value pairs, and the second map thread configured to apply the application specific map operation to records in the second data block to produce a second set of key-value pairs, the first set of key-value pairs and the second set of key-value pairs including at least one key common to the first and second set of key-value pairs; and
      a multiblock combiner configured to apply a combining operation to values associated with the common key in the first and second sets of key-value pairs to produce a combined value, to identify that the first map thread and the second map thread have completed applying the application specific map operation to the first distinct input block and the second distinct input block including identifying that all records in the first distinct input block and the second distinct input block have been processed, to determine whether to output intermediate data including one or more pairs of keys and combined values, and to output the intermediate data in response to identifying that all records in the first distinct input block and the second distinct input block have been processed and determining to output the intermediate data; and
   a set of reduce processes, each reduce process being configured to access at least a subset of the intermediate data output by the multiblock combiners, the subset of intermediate data including at least a subset of the pairs of keys and combined values, and, for each key in the subset of keys and combined values, apply an application specific reduce operation to the combined values associated with the key to produce output data.

2. The system of claim 1 wherein:
   the first and second map threads are configured to convert the first and second key-value pairs from a native data format other than strings into a set of strings and pass the set of strings to the multiblock combiner; and
   the multiblock combiner is configured to receive and parse the set of strings.

3. The system of claim 1 wherein the first and second map threads are configured to pass the first and second set of key-value pairs directly to the multiblock combiner in a native data format other than strings.

4. The system of claim 1 wherein the multiblock combiner is configured to apply the combining operation to the key-value pairs in the first and second set of key-value pairs as the key-value pairs are produced by the map thread and passed to the multiblock combiner.

5. The system of claim 1 wherein the multiblock combiner is configured to receive the first and second set of key-value pairs from the map thread and to apply the combining operation to the key-value pairs in the first and second set of key-value pairs after receiving the first and second set of key-value pairs.

6. The system of claim 1 wherein at least two of the map processes operate simultaneously and at least two of the reduce processes operate simultaneously.

7. The system of claim 1 wherein the instructions cause the one or more processing devices to implement a master process configured to coordinate processing among the set of map processes and the set of reduce processes, wherein the coordinating includes assigning input data blocks to individual map processes in the set of map processes.

8. The system of claim 1 wherein the multiblock combiner includes multiple output threads executing in parallel and configured to output the intermediate data, wherein the intermediate data includes reduce shards and each output thread is configured to handle writing output destined for a subset of the reduce shards.

9. A method for parallel processing of data, the method comprising:
   executing a set of map processes on one or more interconnected processing devices;
   assigning one or more input data blocks to each of the map processes, wherein at least one of the map processes is assigned a first input data block and a second input data block, and wherein the first input data block is distinct from the second input data block;
   in the at least one map process, applying, by a first map thread, an application specific map operation to records in the first data block to produce a first set of key-value pairs;
   in the at least one map process, applying, by a second map thread, the application specific map operation to records in the second data block to produce a second set of key-value pairs, the first set of key-value pairs and the second set of key-value pairs including at least one key common to the first and second set of key-value pairs;
   in the at least one map process, applying a combining operation to values associated with the common key in the first and second sets of key-value pairs to produce a combined value;
   in the at least one map process, identifying that the first map thread and the second map thread have completed applying the application specific map operation to the first input data block and the second input data block including identifying that all records in the first distinct input block and the second distinct input block have been processed;
   outputting, from the set of map processes, the intermediate data, in response to identifying that all records in the first distinct input block and the second distinct input blocks have been processed and determining to output the intermediate data;
   executing a set of reduce processes on one or more interconnected processing devices;
   in at least one of the reduce processes, accessing at least a subset of the intermediate data output by the set of map processes, the subset of intermediate data including at least a subset of the pairs of keys and combined values;
   in the at least one reduce process, for each key in the subset of keys and combined values, apply an application specific reduce operation to the combined values associated with the key to produce output data.

10. The method of claim 9 further comprising:
    converting the first and second key-value pairs from a native data format other than strings into a set of strings; and
    wherein applying a combining operation comprises parsing the set of strings at a multiblock combiner.

11. The method of claim 9 wherein applying a combining operation comprises receiving the first and second set of key-value pairs at a multiblock combiner in a native data format other than strings.

12. The method of claim 9 wherein applying the combining operation to the key-value pairs in the first and second set of key-value pairs comprises applying the combining operation to the key-value pairs in the first and second set of key-value pairs as the key-value pairs are received by a multiblock combiner.

13. The method of claim 9 further comprising:
receiving the first and second set of key-value pairs at a multiblock combiner; and
wherein applying combining operation to the key-value pairs in the first and second set of key-value pairs comprises applying combining operation to the key-value pairs in the first and second set of key-value pairs after receiving the first and second set of key-value pairs at the multiblock combiner.

14. The method of claim 9 wherein:
applying the application specific map operation to records in the first data block to produce the first set of key-value pairs comprises applying the application specific map operation by a first map thread; and
applying the application specific map operation to records in the second data block to produce the second set of key-value pairs comprises applying the application specific map operation by a second map thread.

15. The method of claim 9 wherein at least two of the map processes operate simultaneously and at least two of the reduce processes operate simultaneously.

16. The method of claim 9 further comprising executing a master process configured to coordinate processing among the set of map processes and the set of reduce processes, wherein the coordinating includes assigning input data blocks to individual map processes in the set of map processes.

17. A system for parallel processing of data, the system comprising:
one or more processing devices;
one or more storage devices storing instructions that, when executed by the one or more processing devices, cause the one or more processing devices to implement:
a set of map processes, each map process including:
a first map thread configured to access a first distinct input data blocks assigned to the map process and a second map thread configured to access a second distinct input data blocks assigned to the map process, the first map thread configured to apply an application specific map operation to records in the first data block to produce a first set of map output data, and the second map thread configured to apply the application specific map operation to records in the second data block to produce a second set of map output data, the first set of map output data including at least a first value that is logically associated with at least a second value in the second set of map output data; and
a multiblock combiner configured to apply a combining operation to values associated with the common key in the first and second sets of key-value pairs to produce a combined value, to identify that the first map thread and the second map thread have completed applying the application specific map operation to the first distinct input block and the second distinct input block including identifying that all records in the first distinct input block and the second distinct input block have been processed, to determine whether to output intermediate data including one or more pairs of keys and combined values, and to output the intermediate data in response to identifying that all records in the first distinct input block and the second distinct input block have been processed and determining to output the intermediate data; and
a set of reduce processes, each reduce process being configured to access at least a subset of the intermediate data output by the multiblock combiners, the subset of intermediate data including at least one set of logically associated combined values and apply an application specific reduce operation to the set of logically associated combined values to produce output data.

18. The system of claim 17 wherein the first value and the second value are logically associated with one another by a common key.

19. The system of claim 18 wherein the common key is implicit in the first and second sets of map output data.

20. The system of claim 18 wherein the common key is explicit in the first and second sets of map output data.

21. The system of claim 20 wherein the common key, the first value, and the second value, are represented as key-value pairs in the first and second sets of map output.

22. The system of claim 1, wherein the multiblock combiner is further configured to output the intermediate data including the one or more pairs of keys and combined values in response to an occurrence of a trigger condition.

23. The system of claim 22, wherein the occurrence of the trigger condition includes the multiblock combiner receiving a flush command indicating that the intermediate data should be output.

24. The system of claim 22, wherein the occurrence of the trigger condition includes the multiblock combiner detecting that an amount of memory used for the intermediate data is greater than or equal to a threshold.

25. The system of claim 1, wherein the multiblock combiner identifying that the first map thread and the second map thread have completed applying the application specific map operation to the first distinct input block and the second distinct input block includes receiving an indication from the first map thread and the second map thread that applying the application specific map operation to the first distinct input block and the second distinct input block has finished.

* * * * *